US010296850B2

(12) United States Patent
Aliferis et al.

(10) Patent No.: US 10,296,850 B2
(45) Date of Patent: May 21, 2019

(54) DOCUMENT CODING COMPUTER SYSTEM AND METHOD WITH INTEGRATED QUALITY ASSURANCE

(71) Applicants: Konstantinos (Constantin) F. Aliferis, Astoria, NY (US); Yin Aphinyanaphongs, New York, NY (US); Alexander Statnikov, New York, NY (US); Lawrence Fu, Long Island City, NY (US)

(72) Inventors: Konstantinos (Constantin) F. Aliferis, Astoria, NY (US); Yin Aphinyanaphongs, New York, NY (US); Alexander Statnikov, New York, NY (US); Lawrence Fu, Long Island City, NY (US)

(*) Notice: Subject to any disclaimer, the term of this patent is extended or adjusted under 35 U.S.C. 154(b) by 547 days.

(21) Appl. No.: 14/216,155

(22) Filed: Mar. 17, 2014

(65) Prior Publication Data
US 2014/0279761 A1    Sep. 18, 2014

Related U.S. Application Data

(60) Provisional application No. 61/793,765, filed on Mar. 15, 2013.

(51) Int. Cl.
*G06N 20/00* (2019.01)
*G06N 5/02* (2006.01)
(Continued)

(52) U.S. Cl.
CPC ............ *G06Q 10/00* (2013.01); *G06F 16/93* (2019.01); *G06N 5/022* (2013.01); *G06N 20/00* (2019.01)

(58) Field of Classification Search
CPC ......... G06N 99/00; G06N 5/022; G06F 3/048
See application file for complete search history.

(56) References Cited

U.S. PATENT DOCUMENTS

2009/0077068 A1* 3/2009 Aphinyanaphongs ...................... G06F 17/3071
2014/0173618 A1* 6/2014 Neuman .............. G06F 9/5066 718/104

OTHER PUBLICATIONS

McCallumzy, A., et al. "Employing EM and pool-based active learning for text classification." Proc. International Conference on Machine Learning (ICML). 1998.*

(Continued)

*Primary Examiner* — Eric Nilsson
(74) *Attorney, Agent, or Firm* — Laurence Weinberger

(57) ABSTRACT

The present invention consists of a computer-implemented system and method for automatically analyzing and coding documents into content categories suitable for high cost, high yield settings where quality and efficiency of classification are essential. A prototypical example application field is legal document predictive coding for purposes of e-discovery and litigation (or litigation readiness) where the automated classification of documents as "responsive" or not must be (a) efficient, (b) accurate, and (c) defensible in court. Many text classification technologies exist but they focus on the relatively simple steps of using a training method on training data, producing a model and testing it on test data. They invariably do not address effectively and simultaneously key quality assurance requirements. The invention applies several data design and validation steps that ensure quality and removal of all possible sources of document classification error or deficiencies. The invention employs multiple classification methods, preprocessing methods, visualization and organization of results, and explanation of models which further enhance predictive quality, but also ease of use of models and user acceptance. The invention can be applied to practically any field where text classification is desired.

8 Claims, 5 Drawing Sheets

(51) Int. Cl.
*G06Q 10/00* (2012.01)
*G06F 16/93* (2019.01)

(56) References Cited

OTHER PUBLICATIONS

Simple Random Sampling and other Sampling Methods. [retrieved on Aug. 12, 2016]. retrieved from the internet <URL: https://onlinecourses.science.psu.edu/stat100/node/18>.*
Davenport TH, Harris JG: Competing on analytics: the new science of winning: Harvard Business Press; 2013.
Douglas L: The Importance of 'Big Data': A Definition. Gartner (Jun. 2012) 2012.
NIH Big Data to Knowledge (BD2K) [http://bd2k.nih.gov/about_bd2k.html#bigdata].
Provost F, Fawcett T: Data Science for Business: What you need to know about data mining and data-analytic thinking: "O'Reilly Media, Inc."; 2013.
Siegel E: Predictive Analytics: The Power to Predict Who Will Click, Buy, Lie, or Die: John Wiley & Sons; 2013.
Aliferis C, Statnikov A, Aphinyanaphongs Y, Fu L, McCreary M, McCutcheon M: Predictive Coding: Value, Technology and Strategic Opportunity. In.: Rational Intelligence; 2013.
Aphinyanaphongs Y, Fu Ld, Li Z, Peskin ER, Efstathiadis E, Aliferis CF, Statnikov A: A comprehensive empirical comparison of modern supervised classification and feature selection methods for text categorization. Journal of the Association for Information Science and Technology 2014.

* cited by examiner

| Threshold | Recall | Precision | True Positives | False Positives | False Negatives | Total |
|---|---|---|---|---|---|---|
| 0.0001 | 1.000 | 0.052 | 3,586 | 65,378 | 0 | 68,965 |
| 0.0002 | 1.000 | 0.090 | 3,586 | 36,260 | 0 | 39,846 |
| 0.0003 | 1.000 | 0.124 | 3,586 | 25,334 | 0 | 28,921 |
| 0.0004 | 1.000 | 0.153 | 3,586 | 19,853 | 0 | 23,439 |
| 0.0005 | 0.999 | 0.175 | 3,583 | 16,889 | 4 | 20,472 |
| 0.0006 | 0.997 | 0.194 | 3,575 | 14,854 | 11 | 18,430 |
| 0.0007 | 0.997 | 0.215 | 3,575 | 13,054 | 11 | 16,630 |
| 0.0008 | 0.992 | 0.230 | 3,557 | 11,910 | 29 | 15,467 |
| 0.0009 | 0.989 | 0.246 | 3,547 | 10,871 | 39 | 14,418 |
| 0.001 | 0.985 | 0.259 | 3,532 | 10,106 | 54 | 13,638 |
| 0.0011 | 0.978 | 0.273 | 3,507 | 9,340 | 79 | 12,847 |
| AUC=0.996 | | | | | | |

Figure 3

| Sample Size | Prior | AUC | Lower Bound | Upper Bound |
|---|---|---|---|---|
| 2000 | 1% | 0.8172 | 0.6487 | 0.9532 |
| 2000 | 2% | 0.8579 | 0.7719 | 0.9322 |
| 2000 | 3% | 0.8811 | 0.8225 | 0.9357 |
| 2000 | 5% | 0.9072 | 0.8608 | 0.9510 |
| 2000 | 10% | 0.9307 | 0.9034 | 0.9593 |
| 2000 | 20% | 0.9487 | 0.9347 | 0.9650 |

Figure 4

DOCUMENT CODING COMPUTER SYSTEM AND METHOD WITH INTEGRATED QUALITY ASSURANCE

Benefit of U.S. Provisional Application No. 61/793,765 filed on Mar. 15, 2013 is hereby claimed.

BACKGROUND OF THE INVENTION

Field of Application

The field of application of the invention is data analysis especially as it applies to (so-called) "Big Data" (see sub-section 1 "Big Data and Big Data Analytics" below). The methods, systems and overall technology and knowhow needed to execute data analyses is referred to in the industry by the term data analytics. Data analytics is considered a key competency for modern firms [1]. Modern data analytics technology is ubiquitous (see sub-section 3 below "Specific examples of data analytics application areas"). Data analytics encompasses a multitude of processes, methods and functionality (see sub-section 2 below "Types of data analytics").

Data analytics cannot be performed effectively by humans alone due to the complexity of the tasks, the susceptibility of the human mind to various cognitive biases, and the volume and complexity of the data itself. Data analytics is especially useful and challenging when dealing with hard data/data analysis problems (which are often described by the term "Big Data"/"Big Data Analytics" (see sub-section 1 "Big Data and Big Data Analytics").

1. Big Data and Big Data Analytics

Big Data Analytics problems are often defined as the ones that involve Big Data Volume, Big Data Velocity, and/or Big Data Variation [2].

- Big Data Volume may be due to large numbers of variables, or big numbers of observed instances (objects or units of analysis), or both.
- Big Data Velocity may be due to the speed via which data is produced (e.g., real time imaging or sensor data, or online digital content), or the high speed of analysis (e.g., real-time threat detection in defense applications, online fraud detection, digital advertising routing, high frequency trading, etc.).
- Big Data Variation refers to datasets and corresponding fields where the data elements, or units of observations can have large variability that makes analysis hard. For example, in medicine one variable (diagnosis) may take thousands of values that can further be organized in interrelated hierarchically organized disease types.

According to another definition, the aspect of data analysis that characterizes Big Data Analytics problems is its overall difficulty relative to current state of the art analytic capabilities. A broader definition of Big Data Analytics problems is thus adopted by some (e.g., the National Institutes of Health (NIH)), to denote all analysis situations that press the boundaries or exceed the capabilities of the current state of the art in analytics systems and technology. According to this definition, "hard" analytics problems are de facto part of Big Data Analytics [3].

2. Types of Data Analysis

The main types of Plata analytics [4] are:

a. Classification for Diagnostic or Attribution Analysis: where a typically computer-implemented system produces a table of assignments of objects into predefined categories on the basis of object characteristics.

Examples: medical diagnosis; email spam detection; separation of documents as responsive and unresponsive in litigation.

b. Regression for Diagnostic Analysis: where a typically computer-implemented system produces a table of assignments of numerical values to objects on the basis of object characteristics.

Examples: automated grading of essays; assignment of relevance scores to documents for information retrieval; assignment of probability of fraud to a pending credit card transaction c. Classification for Predictive Modeling: where a typically computer-implemented system produces a table of assignments of objects into predefined categories on the basis of object characteristics and where values address future states (i.e., system predicts the future).

Examples: expected medical outcome after hospitalization; classification of loan applications as risky or not with respect to possible future default; prediction of electoral results.

d. Regression for Predictive Modeling: where a typically computer-implemented system produces a table of assignments of numerical values to objects on the basis of object characteristics and where values address future states (i.e., system predicts the future) Examples: predict stock prices at a future time; predict likelihood for rain tomorrow; predict likelihood for future default on a loan.

e. Explanatory Analysis: where a typically computer-implemented system produces a table of effects of one or more factors on one or more attributes of interest; also producing a catalogue of patterns or rules of influences.

Examples: analysis of the effects of sociodemographic features on medical service utilization, political party preferences or consumer behavior.

f. Causal Analysis: where atypically computer-implemented system produces a table or graph of causes-effect relationships and corresponding strengths of causal influences describing thus how specific phenomena causally affect a system of interest.

Example: causal graph models of how gene expression of thousands of genes interact and regulate development of disease or response to treatment; causal graph models of how socioeconomic factors and media exposure affect consumer (propensity to buy certain products; systems that optimize the number of experiments needed to understand the causal structure of a system and manipulate it to desired states.

g. Network Science Analysis: where atypically computer-implemented system produces a table or graph description of how entities in a big system inter-relate and define higher level properties of the system.

Example: network analysis of social networks that describes how persons interrelate and can detect who is married to whom; network analysis of airports that reveal how the airport system has points of vulnerability i.e., hubs) that are responsible for the adaptive properties of the airport transportation system (e.g., ability to keep the system running by rerouting flights in case of an airport closure).

h. Feature selection, dimensionality reduction and data compression: where a typically computer-implemented system selects and then eliminates all variables that are irrelevant or redundant to a classification/regression, or explanatory or causal modeling (feature selection) task;

or where such as system reduces a large number of variables to a small number of transformed variables that are necessary and sufficient for classification/regression, or explanatory or causal modeling (dimensionality reduction or data compression).

Example: in order to perform web classification into family-friendly ones or not, web site contents are first cleared of all words or content that is not necessary for the desired classification.

i. Subtype and data structure discovery: where analysis seeks to organize objects into groups with similar characteristics or discover other structure in the data.

Example: clustering of merchandize such that items grouped together are typically being bought together; grouping of customers into marketing segments with uniform buying behaviors.

j. Feature construction: where atypically computer-implemented system pre-processes and transforms variables in ways that enable the other goals of analysis. Such pre-processing may be grouping, abstracting, existing features or constructing new features that represent higher order relationships, interactions etc.

Example: when analyzing hospital data for predicting and explaining high-cost patients, co-morbidity variables are grouped in order to reduce the number of categories from thousands to a few dozen which then facilitates the main (predictive) analysis; in algorithmic trading, extracting trends out of individual time-stamped variables and replacing the original variables with trend information facilitates prediction of future stock prices.

k. Data and analysis parallelization, chunking, and distribution: where a typically computer-implemented system performs a variety of analyses (e.g., predictive modeling, diagnosis, causal analysis) using federated databases, parallel computer systems, and modularizes analysis in small manageable pieces, and assembles results into a coherent analysis.

Example: in a global analysis of human capital retention a world-wide conglomerate with 2,000 personnel databases in 50 countries across 1,000 subsidiaries, can obtain predictive models for retention applicable across the enterprise without having to create one big database for analysis.

Important note about terminology: in common everyday use (e.g., in common parlance, in the business analytics and even in parts of the scientific and technical literature) the term "predictive modeling" is used as general-purpose term for all analytic types a, b, c, d, e without discrimination. This is for narrative convenience since it is much less cumbersome to state, for example, that "method X is a predictive modeling method" as opposed to the more accurate but inconvenient "method X is a method that can be used for Classification for Diagnostic or Attribution Analysis, and/or Regression for Diagnostic Analysis, and/or Classification for Predictive Modeling, and/or Regression for Predictive Modeling, and/or Explanatory Analysis". In those cases it is inferred from context what is the precise type of analysis that X is intended for or was used etc.

The present application utilizes this simplifying terminological convention and refers to "predictive modeling" as the application field of the invention to cover analysis types a, b, c, d, and e.

3. Specific Examples of Data Analytics Application Areas: The following Listing provides examples of some of the major fields of application for the invented system specifically, and Data Analytics more broadly [5]:

1. Credit risk/Creditworthiness prediction.
2. Credit card and general fraud detection.
3. Intention and threat detection.
4. Sentiment analysis.
5. Information retrieval, filtering, ranking, and search.
6. Email spam detection.
7. Network intrusion detection.
8. Web site classification and filtering.
9. Matchmaking.
10. Predict success of movies.
11. Police and national security applications
12. Predict outcomes of elections.
13. Predict prices or trends of stock markets.
14. Recommend purchases.
15. Online advertising.
16. Human Capital/Resources: recruitment, retention, task selection, compensation.
17. Research and Development.
18. Financial Performance.
19. Product and Service Quality.
20. Client management (selection, loyalty, service).
21. Product and service pricing.
22. Evaluate and predict academic performance and impact.
23. Litigation: predictive coding, outcome/cost/duration prediction, bias of courts, voire dire.
24. Games (e.g., chess, backgammon, jeopardy).
25. Econometrics analysis.
26. University admissions modeling.
27. Mapping fields of activity.
28. Movie recommendations.
29. Analysis of promotion and tenure strategies.
30. Intension detection and lie detection based on fMRI readings.
31. Dynamic Control (e.g., autonomous systems such as vehicles, missiles; industrial robots; prosthetic limbs).
32. Supply chain management.
33. Optimizing medical outcomes, safety, patient experience, cost, profit margin in healthcare systems.
34. Molecular profiling and sequencing based diagnostics, prognostics, companion drugs and personalized medicine.
35. Medical diagnosis, prognosis and risk assessment.
36. Automated grading of essays.
37. Detection of plagiarism.
38. Weather and other physical phenomena forecasting.

The present invention in particular is focused on the general field of computer-based predictive modeling of documents often referred to as "text classification" and in some application domains (e.g., the legal domain) "predictive coding". This is an established field with extensive applications in the areas of legal document classification, information retrieval, medical record automated coding etc.

The present invention consists of a computer-implemented system and method for automatically analyzing and coding documents into content categories suitable for high cost, high yield settings where quality and efficiency of classification are essential. A prototypical example application field is legal document predictive coding for purposes of e-discovery and litigation (or litigation readiness) where the automated classification of documents as "responsive" or not must be (a) efficient, (b) accurate, and (c) defensible in court. Although many text classification technologies exist they focus only on the steps of using a training method on training data, producing a model and testing it on test data. They invariably fail to address effectively and simultaneously the follow key quality assurance requirements:

i. Producing as few false positives and false negatives as possible (i.e., maximizing predictivity while respecting user tradeoffs between false positives and negatives).
ii. Ensuring that the labeling of documents used for training is accurate.
iii. Ensuring that the sampling of documents for creation of training and testing corpora is of high quality.
iv. Minimizing the amount of human effort required to label training and testing corpora used by the system for training and testing.
v. Ensuring that the final models produced by the system are well calibrated and properly thresholded for use.

The invention provides a "closed loop", highly integrated, and quality-assurance-oriented process and system for the execution of efficient and highly accurate text categorization. The invention is characterized by:
(a) Application of several data design and validation steps that ensure quality and removal of all possible sources of document classification error or deficiencies; and tight integration with:
(b) Multiple classification methods, preprocessing methods, visualization and organization of results, and explanation of models which further enhance predictive quality, but also ease of use of models and user acceptance.

The invention can be applied to practically any field where text classification is desired.

BRIEF DESCRIPTION OF THE FIGURES

FIG. 3 depicts outcomes from step 5.

FIG. 4 depicts outcomes from steps 3 and 4.

DETAILED DESCRIPTION OF THE INVENTION

Figure 1:
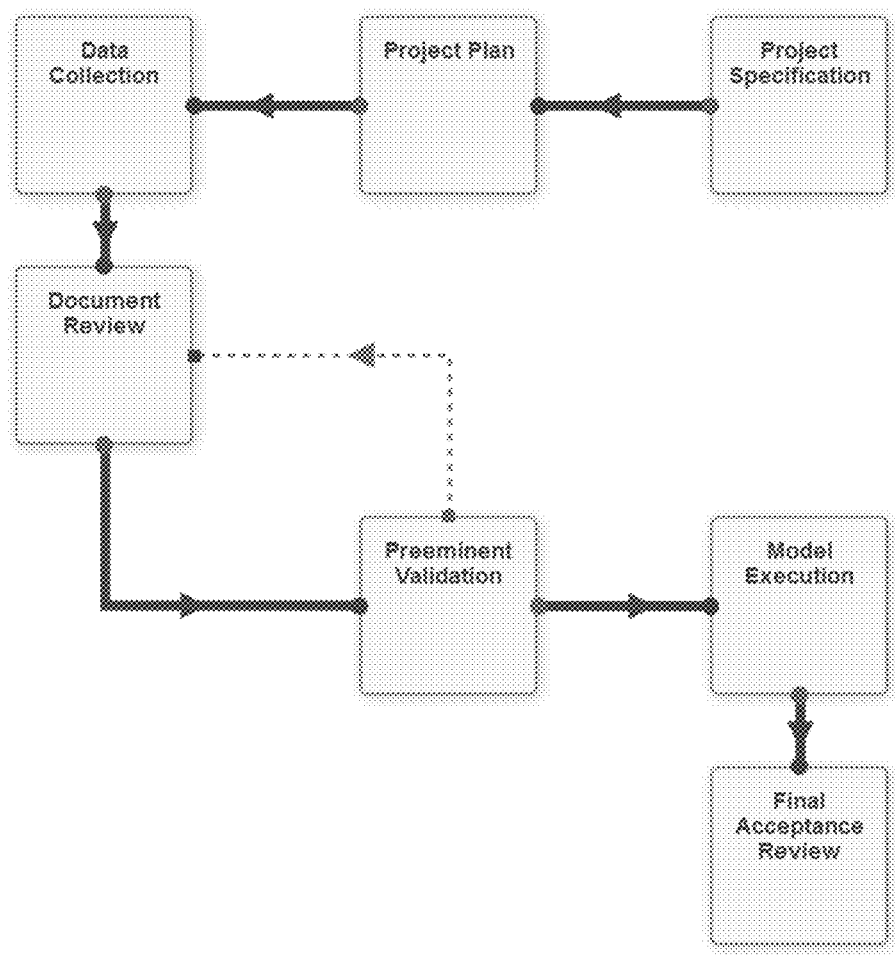
FIG. 1 depicts a high-level flow diagram of the overall core process of human validated text classification.

FIG. 1 shows the overall process of text classification. The first step is classification specification. In this step, users write out specific guidelines for classification in such a way as to ensure consistency and resolve ambiguities in the classification process. A measure of the consistency is to write rules in such a way that a third party could apply the process and a statistic such as the coefficient of concordance kappa is satisfied at a specified agreement threshold. The second step is human application of the classification guidelines to a sample of the unlabeled document collection to produce a labeled document collection. The third step is feasibility modeling. In this step, preliminary models are built with single or multiple text classification methods and generalization error is estimated using a multitude of methods. The results of the feasibility modeling are then presented to the user. In the fourth step, the models are optimized. An embodiment of this optimization may involve additional sampling, improved classification guidelines, addition of labeled documents from other document collections, or addition of labeled documents obtained outside the sampling process. In the fifth step, models are explained through a multitude of methods. The explained models are presented to the user in such a way that divulge the inner workings of the modeling methods and explain how the models work to the user along with words and features that are important to the models. In the sixth step called preeminent validation, the established model is validated on a second subset of the data not used for training. In this step, the second subset may embody a prelabeled subset or user found documents that match their criteria. If the second subset exhibits performance inconsistent with performance expected from the third step of feasibility modeling, then the analysis goes back to the prior step of model optimization. Provided that the second subset exhibits performance as expected from the third step of feasibility modeling, the process then goes to model execution. Before model execution calibration, thresholding, and building a final model and application of it to the rest of the collection are performed.

Figure 2:
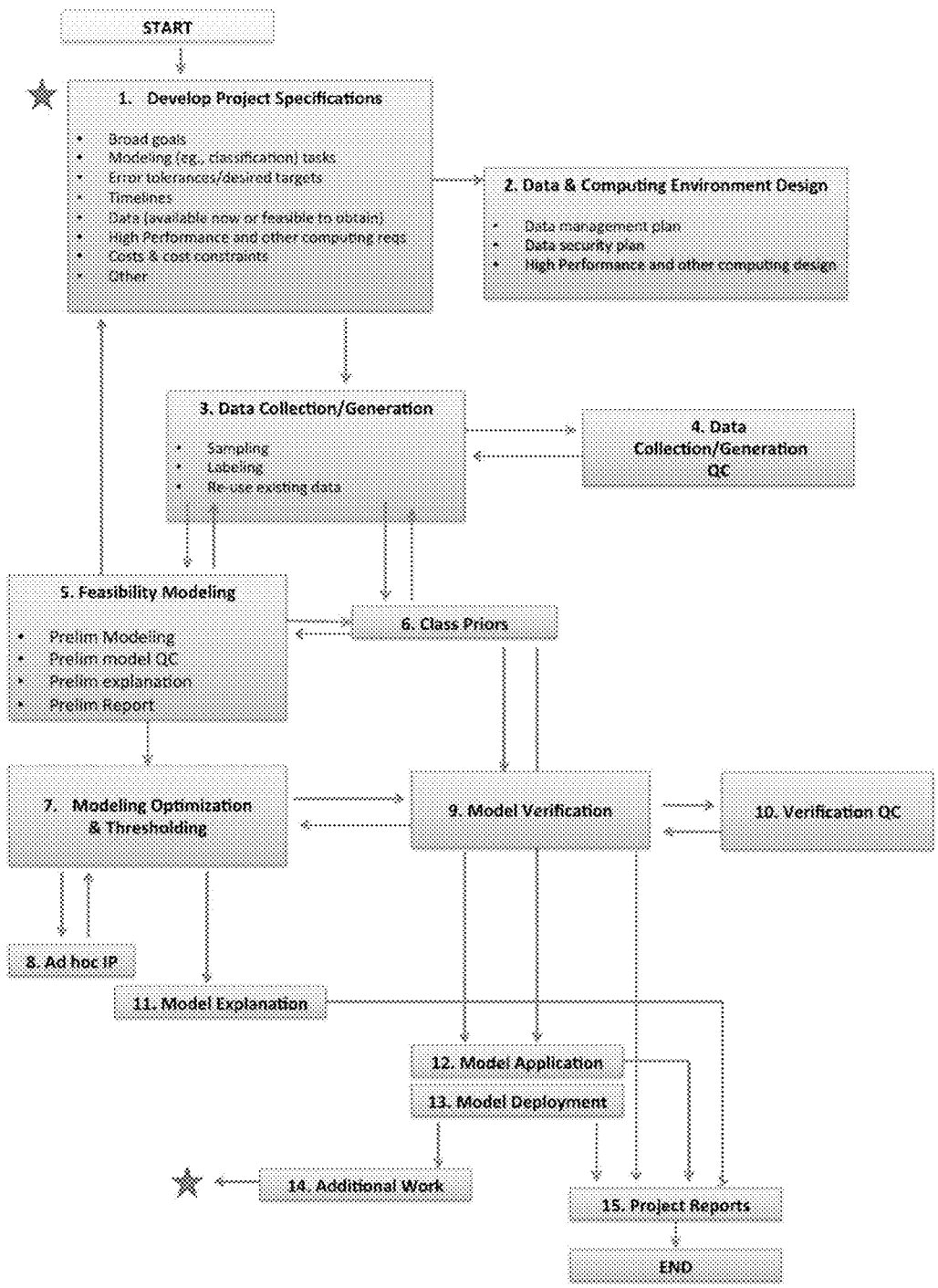
FIG. 2 depicts a flow diagram of the system steps and functions for text classification.

FIG. 2 gives a detailed depiction of the steps employed by the inventive method:
i. In step 1, user goals are collected, modeling/classification tasks are defined, user error tolerances/desired performance targets are elicited, and timelines are determined. In addition it is determined which data is available now and/or feasible to obtain, what are computing and other computational requirements, and what are expected costs and cost constraints.
ii. In step 2, users are presented with options related to a data and computing environment design that includes data management plan, data security plan, and optionally a high performance computing plan.
iii. In step 3, data is collected/generated.
Data collection involves activities such as accessing individual computers and content stored on each or accessing a centralized server that contains all the necessary content. Once the data is collected, the data collection process includes sampling, human labeling, or re-using existing labeled data.
The sampling includes a multitude of types including random sampling, stratified sampling, convenience sampling, and active learning based iterative sampling.
The human labeling includes single person labeling or collaborative labeling approaches.
iv. In parallel with step 3, step 4 in the process is performance quality control of the data. Quality control steps include:
ensuring accurate digital representation and conversions of documents to formats that are machine processable.
ensuring accurate and consistent labeling by the users through resolution of disagreements in labeling and statistical application of inter-rater reliability metrics.
v. Steps 5 and 6, perform feasibility modeling and assess class imbalance follow respectively. The feasibility modeling step includes preliminary model, model quality control, and model explanation. In this step, preliminary models are built using a multitude of text classification methods that may run individually or be combined. The models are evaluated for generalization against a specified performance metric. This metric may include recall, precision, area under the curve, or other such measure of classification performance.
vi. At step 7, the feasibility model is optimized. This optimization involves additional sampling, improved classification guidelines, addition of labeled documents from other document collections, or addition of unsampled labeled documents. Step 7 optionally also include model calibration and thresholding, also included in Step 9 and 12.

vii. Steps 1-6 may be iterated until the user is satisfied with the model performance.
viii. In step 8 intellectual property related documentation is produced.
ix. Once step 7 develops a final model, steps 9 and 10 verify the model and run quality control on the model. Verification takes the forms of:
producing a second labeled sample from step 3 or
using a predefined set of documents not used to train the model or
user verification of a random selection of documents from a training cross-validation step or
using a random selection of documents from the second subset randomly labeled.
x. Steps 7-10 can be repeated if needed.
xi. In step 11, the model is explained by translating it to more human-accessible forms such as decision trees and rule sets and showing how the classification is made by the various classifiers. The explanation may also involve analysis of the words and their patterns that make the classification possible.
xii. With appropriate verification from step 10, the final model is applied to documents in step 12.
xiii. The final model can be deployed in a computational or other environment in step 13.
xiv. Finally, additional predictive coding work may occur in step 14 or the analysis is completed and finalized with a detailed report produced at step 15.

A variant of the method applies a third set of documents to a preexisting model built using the flow diagram in FIG. 2. In this case, step 9 and 10 are implemented and the model is verified with this third set of documents. If the model performs as expected on this new set, then the process continues with step 12, 13, 14, and 15. If the model does not perform as expected, then steps 1-7 are iterated until desired accuracy is obtained.

FIG. 3 shows an example performance output from applying the system on a predictive coding dataset for litigation form actual practice (Rational Intelligence Partners LLC, 2013). This figure shows a threshold and recall, precision, true positives, false positives, false negatives, and total number of documents. The figure also shows performance of an application of this workflow at the bottom of the figure (AUC of 0.996).

FIG. 4 shows the empirical 90% range of observed performance (measured by Area Under the ROC curve) in a random sample of 2000 documents as a function of different prior probabilities of positive documents and under the assumption that training with all documents (i.e., maximum signal achievable in the dataset at hand) is 95% AUC. The figure justifies the use of the proposed sample size by the user for priors of positives 5% or greater.

Additional details about the empirical performance of the system across many datasets, comparisons to various text classification methods, detailed analysis of sampling designs, and details of system output are provided in references [6, 7].

Method and System Output, Presentation, Storage, and Transmittance

The relationships, correlations, and significance (thereof) discovered by application of the method of this invention may be output as graphic displays (multidimensional as required), probability plots, linkage/pathway maps, data tables, and other methods as are well known to those skilled in the art. For instance, the structured data stream of the method's output can be routed to a number of presentation, data/format conversion, data storage, and analysis devices including but not limited to the following: (a) electronic graphical displays such as CRT, LED, Plasma, and LCD screens capable of displaying text and images; (b) printed graphs, maps, plots, and reports produced by printer devices and printer control software; (c) electronic data files stored and manipulated in a general purpose digital computer or other device with data storage and/or processing capabilities; (d) digital or analog network connections capable of transmitting data; (e) electronic databases and file systems. The data output is transmitted or stored after data conversion and formatting steps appropriate for the receiving device have been executed.

Software and Hardware Implementation

Figure 5:
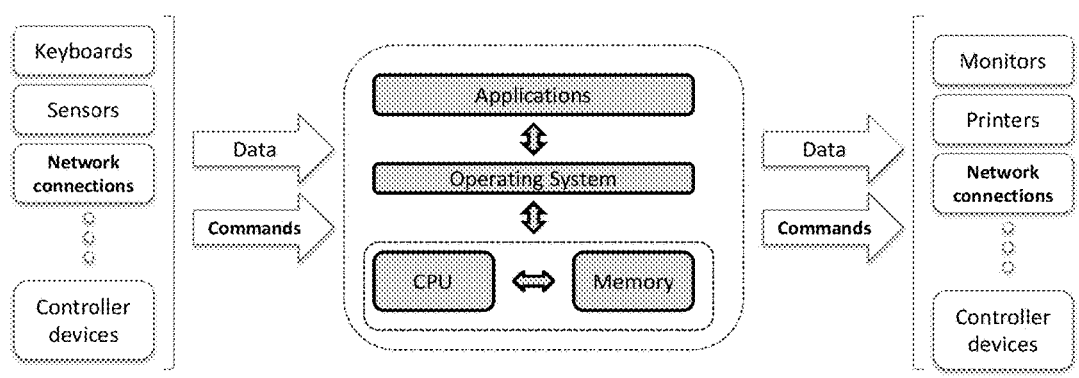
FIG. 5 shows the organization of a general-purpose modern digital computer system such as the ones used for the typical implementation of the invention.

Due to large numbers of data elements in the datasets, which the present invention is designed to analyze, the invention is best practiced by means of a general purpose digital computer with suitable software programming (i.e., hardware instruction set) (FIG. 5 describes the architecture of modern digital computer systems). Such computer systems are needed to handle the large datasets and to practice the method in realistic time frames. Based on the complete disclosure of the method in this patent document, software code to implement the invention may be written by those reasonably skilled in the software programming arts in any one of several standard programming languages including, but not limited to, C, Java, and Python. In addition, where applicable, appropriate commercially available software programs or routines may be incorporated. The software program may be stored on a computer readable medium and implemented on a single computer system or across a network of parallel or distributed computers linked to work as one. To implement parts of the software code, the inventors have used MathWorks Matlab® and a personal computer with an Intel Xeon CPU 2.4 GHz with 24 GB of RAM and 2 TB hard disk.

REFERENCES

1. Davenport T H, Harris J G: Competing on analytics: the new science of winning: Harvard Business Press; 2013.
2. Douglas L: The Importance of 'Big Data': A Definition. Gartner (June 2012) 2012.
3. NIH Big Data to Knowledge (BD2K) [http://bd2k.nih.gov/about_bd2k.html#bigdata]
4. Provost F, Fawcett T: Data Science for Business: What you need to know about data mining and data-analytic thinking: "O'Reilly Media, Inc."; 2013.
5. Siegel E: Predictive Analytics: The Power to Predict Who Will Click, Buy, Lie, or Die: John Wiley & Sons; 2013.
6. Aliferis C, Statnikov A, Aphinyanaphongs Y, Fu L, McCreary M, McCutcheon M: Predictive Coding: Value, Technology and Strategic Opportunity. In.: Rational Intelligence; 2013.
7. Aphinyanaphongs Y, Fu L D, Li Z, Peskin E R, Efstathiadis E, Aliferis C F, Statnikov A: A comprehensive empirical comparison of modern supervised classification and feature selection methods for text categorization. *Journal of the Association for Information Science and Technology* 2014.

We claim:
1. A quality-assurance oriented computer-implemented method for automatically classifying text using machine learning comprising the following steps:

a) eliciting user goals, classification tasks, user error tolerances and desired performance targets, analysis timelines, availability of data, feasibility of data collection, availability of computing resources, acceptable costs, and user cost constraints;

b) presenting to users and obtaining their preferences and approvals related to a data and computing environment design including data management plan, data security plan, and high performance computing plan;

c) collecting data needed for model training and verification, accessing individual computers or centralized servers that contain the document data, sampling documents for training and testing, labeling sampled data or re-using existing labels;

d) performing quality control of the document data by ensuring accurate digital representation and conversions of documents to formats that are machine processable, and ensuring accurate and consistent labeling by the users through resolution of disagreements in labeling and statistical application of inter-rater reliability metrics;

e) performing feasibility modeling, including preliminary modeling, model quality control, and model explanation;

f) assessing class imbalance and using the information for adjusting data collection, and conducting model training and verification;

g) optimizing the feasibility model of step e) via additional sampling, improving labeling and classification guidelines, adding in the training corpus labeled documents from other document collections, adding unsampled labeled documents, and optionally performing model calibration and thresholding;

h) iterating step a) to f) until the user is satisfied with the model performance;

i) producing intellectual property related documentation;

j) verifying the optimized model of step g);

k) ensuring quality control of the verification process by producing a second labeled sample from the data of step c), using a predefined set of documents not used to train the model, conducting user verification of a random selection of documents from a training cross-validation step, or using a random selection of documents from the second subset randomly labeled;

l) iterating steps g) to k) until the user is satisfied with the model performance;

m) explaining the optimized and verified model by translating it to more human-accessible forms such as decision trees and rule sets and showing how the classification is made by the various classifiers; analyzing the predictivity of individual words and word patterns used by the model;

n) applying the final model to the application set of documents;

o) deploying the final model in a computational environment for continuous future use; and p) completing the analysis and outputting a detailed report.

2. The computer-implemented method of claim 1 where sampling documents is conducted by random sampling.

3. The computer-implemented method of claim 1 where sampling documents is conducted by stratified sampling.

4. The computer-implemented method of claim 1 where sampling documents is conducted by convenience (case-control non-random) sampling.

5. The computer-implemented method of claim 1 where sampling documents is conducted by active learning based iterative sampling.

6. The computer-implemented method of claim 1 where the labeling includes single person labeling or collaborative labeling approaches.

7. The computer-implemented method of claim 1 where models are built using a multitude of text classification methods and the best model and learning method are selected or models are combined.

8. The computer-implemented method of claim 1 where a third set of documents is applied to a preexisting model comprising the following steps:
   a) verifying the model with application of steps j) and k);
   b) if the model performs as expected or desired on this new set, then the process continuing with steps n), o), p), and q); and
   c) if the model does not perform as expected, then steps a) to g) iterating until desired accuracy is obtained.

* * * * *